(12) United States Patent
Berrezag et al.

(10) Patent No.: US 11,070,119 B2
(45) Date of Patent: Jul. 20, 2021

(54) MANUFACTURING METHOD OF VIBRATING ACTUATOR

(71) Applicant: Lofelt GmbH, Berlin (DE)

(72) Inventors: Amir Berrezag, Berlin (DE); Daniel Büttner, Berlin (DE)

(73) Assignee: Lofelt GmbH, Berlin (DE)

( * ) Notice: Subject to any disclaimer, the term of this patent is extended or adjusted under 35 U.S.C. 154(b) by 106 days.

(21) Appl. No.: 16/271,600

(22) Filed: Feb. 8, 2019

(65) Prior Publication Data

US 2019/0173367 A1   Jun. 6, 2019

Related U.S. Application Data

(63) Continuation of application No. 14/828,954, filed on Aug. 18, 2015, now Pat. No. 10,218,250.

(30) Foreign Application Priority Data

Jul. 16, 2015   (DE) .......................... 102015111527.1

(51) Int. Cl.
 *H02K 33/00* (2006.01)
 *B06B 1/04* (2006.01)
 *H02K 15/00* (2006.01)

(52) U.S. Cl.
 CPC ............. *H02K 33/00* (2013.01); *B06B 1/045* (2013.01); *H02K 15/00* (2013.01)

(58) Field of Classification Search
 CPC ......... B06B 1/045; H02K 33/00; H02K 15/00
 (Continued)

(56) References Cited

U.S. PATENT DOCUMENTS

| 3,118,022 A | 1/1964 | Sessler et al. |
| 3,812,536 A * | 5/1974 | Linke ....................... G11B 5/29 |
| | | 360/122 |

(Continued)

FOREIGN PATENT DOCUMENTS

| CN | 102055299 A | 5/2011 |
| CN | 103459052 A | 12/2013 |

(Continued)

OTHER PUBLICATIONS

Written Opinion of the International Searching Authority in PCT/EP2016/064522, dated Dec. 2, 2016, 11 pages.

(Continued)

*Primary Examiner* — Alex W Mok
(74) *Attorney, Agent, or Firm* — Chernoff Vilhauer LLP (57) ABSTRACT

A vibrating actuator is disclosed, comprising: a magnetic part including at least two magnets arranged with same polarities facing each other; a receiving part including a hollow member with a cavity for receiving the magnetic part and at least one coil wrapped around the hollow member and fixed thereto; elastic elements interconnecting the magnetic part and the hollow member; and a chassis. In one aspect, the magnetic part is fixed to the chassis via attachment elements such that the magnetic part, attachment elements and chassis are stationary, and the receiving part performs a linear movement with changing direction causing the vibration when an alternating current passes through the coil(s). In another aspect, the elastic elements are flat elastic metal or plastic membranes. In another aspect, a magnetic guidance member of ferromagnetic material partly surrounding the hollow member and coil(s) is mounted to the longitudinally outer ends of the magnetic part.

20 Claims, 3 Drawing Sheets

(58) Field of Classification Search
USPC .......................................................... 310/25
See application file for complete search history.

(56) References Cited

U.S. PATENT DOCUMENTS

| | | | |
|---|---|---|---|
| 7,859,144 B1* | 12/2010 | Sahyoun | H02K 33/16 310/15 |
| 8,264,104 B2 | 9/2012 | Schrader | |
| 2003/0044199 A1* | 3/2003 | Funabashi | G03G 15/1685 399/176 |
| 2004/0161600 A1* | 8/2004 | Igarashi | H01F 1/24 428/328 |
| 2006/0098838 A1 | 5/2006 | Yoo | |
| 2010/0177928 A1* | 7/2010 | Shimokawatoko | H04R 9/027 381/400 |
| 2011/0198949 A1* | 8/2011 | Furuich | H02K 33/16 310/25 |
| 2011/0221283 A1 | 9/2011 | Kawakami | |
| 2012/0112565 A1 | 5/2012 | Lee | |
| 2013/0046131 A1* | 2/2013 | Ball | H04R 25/606 600/25 |
| 2013/0194491 A1 | 8/2013 | Kudo | |
| 2013/0214913 A1* | 8/2013 | Efrati | H02K 35/02 340/407.1 |
| 2013/0311012 A1 | 11/2013 | Black | |
| 2014/0346901 A1 | 11/2014 | Hayward et al. | |

FOREIGN PATENT DOCUMENTS

| | | |
|---|---|---|
| EP | 0580117 A2 | 1/1994 |
| EP | 0587910 A1 | 3/1994 |
| EP | 1420610 A1 | 5/2004 |
| JP | S59148500 A | 8/1984 |

OTHER PUBLICATIONS

International Search Report prepared by the International Searching Authority in PCT/EP2016/064522, dated Dec. 2, 2016, 6 pages.
Office Action prepared by the US Patent and Trademark Office for U.S. Appl. No. 14/828,954, dated Jan. 10, 2018, 7 pages.
Office Action prepared by the US Patent and Trademark Office for U.S. Appl. No. 14/828,954, dated Jun. 4, 2018, 12 pages.
Search Report prepared by the Chinese Patent Office for CN201680041937.0, dated May 23, 2019, 5 pages.

* cited by examiner

MANUFACTURING METHOD OF VIBRATING ACTUATOR

CROSS REFERENCE TO RELATED APPLICATIONS

This application is a continuation of U.S. application Ser. No. 14/828,954, filed Aug. 18, 2015, which claims priority of German Application No. 1020151115271 filed Jul. 16, 2015.

FIELD OF THE INVENTION

The present invention is directed to a vibrating actuator for a variety of applications, for example, a miniature vibrotactile actuator for high-definition haptic feedback to create immersive experiences for video, gaming and music and other immersive experiences.

BACKGROUND AND PRIOR ART

The majority of music we traditionally listen to can be regarded as complex signals resulting from the addition of several signals, e.g., mixed music signals of multiple instruments or voices. With the possibility of electronically recording and reproducing sound, in particular, complex music signals, a further aspect becomes important, namely, the conversion of electric signals to sound waves which are perceived by the listener when the sound is reproduced. In order to reduce distortion problems during reproduction, U.S. Pat. No. 3,118,022 discloses an electroacoustic transducer comprising two conductive members, a diaphragm which includes electret and conductive materials and which is supported between the two conductive members, and a mechanism for electrically connecting to said diaphragm and the two conductive members.

On the other hand, the coupled perception of sound and vibration is a well-known phenomenon. Sound is a mechanical wave that propagates through compressible media such as gas (air-borne sound) or solids (structure-borne sound), wherein the acoustic energy is transported via vibrating molecules and received by the vibrating hair cells in the listener's cochlea. Vibration, on the other hand, is a mechanical stimulus which excites small or large parts of the perceiver's body through a contact surface. The coupled perception of sound and vibration is based on the fact that the human brain receives sound not only through the ears, but also through the skeleton—measurements in a concert hall or church confirm the existence of whole-body vibrations. The body perception of low frequencies is particularly important for an immersive experience of live music or any music sensation that is desired to be pleasurable.

Accordingly, high-definition haptic feedback could be used to create immersive experiences for video, gaming and music and other immersive experiences where the vibration is coupled to continuous audible (or visual) signals. Major requirements for a device to achieve continuous high-definition haptic feedback are:
1. large frequency range, ideally from 20 to 1000 Hz, to be able to generate good quality vibrations over this range, in particular, for music;
2. heavy moving mass, for effective acceleration;
3. small, especially flat, size to make the device portable or wearable;
4. high power efficiency to enable uninterrupted use;
5. silent vibration to avoid disturbance of the sound experience;
6. steady performance to enable continuous use;
7. cost efficient manufacturing to provide an affordable device.

Different vibrating devices to realize a general haptic experience on a person are known. Eccentric motors use an eccentric mass which is attached to the rotating rod of a motor. These motors are widely used and can be very small. However, they have several drawbacks. They operate at a very narrow frequency range, they do not exert a high vibration force and they are not meant for continuous use, all of which makes them unsuitable for many uses including enhanced sound experience and, in particular, music.

Electroactive polymers are very similar to piezoelectric motors but with a higher relative mass displacement. They are still in an early stage of development and one of their drawbacks is that, like eccentric motors, they are not suitable for continuous use because the materials' properties and, thus, the behavior of the motor, quickly change which makes them unsuitable for continuous use including enhanced sound experience and, in particular, music, as well.

Vibrotactile voice-coil or moving magnet-type actuators are normally used in industrial applications and use a voice coil or moving magnet-type actuator consisting of two parts one of which is moving and one of which is stationary, wherein the two parts are interconnected by an elastic attachment. The vibration is generated by the interaction of a movable permanent magnet and a stationary coil surrounding it, wherein, due to the Laplace Force, an alternating current passing through the coil interacts with the magnetic field of the magnet and generates a mechanical force with changing direction on the magnet—this results in a linear movement of the magnet with changing direction, causing the vibration. However, standard linear resonant actuators only have a very narrow frequency range which makes them unsuitable for many uses including enhanced sound experience and, in particular, music. EP 0 580 117 A2 discloses such a moving magnet-type actuator for industrial use in control equipment, electronic equipment, machine tools and the like. In order to improve the performance of actuator, the stationary part comprises at least three coils and the moving part comprises at least two permanent magnets arranged with same poles facing each other such that the magnetic flux is used more effectively because a highly concentrated magnetic field is created in the plane between the magnets. The elastic attachment interconnecting the magnets and the coils consists in compression springs. However, the magnetic field lines, once they have crossed the surrounding coils, are lost and not guided back to the magnets which results in waste of potential magnetic field. Furthermore, like all industrial vibrators, this actuator is noisy which makes it unsuitable for many uses including enhanced sound experience and, in particular, music. US 2014/0346901 A1 discloses a similar moving magnet-type actuator for industrial applications also with a moving part comprising permanent magnets arranged in such a way that same poles face each other—however, the elastic attachment does not consist in compression springs but in resilient diaphragms. Like in the actuator according to EP 0 580 117 A2, there is still a waste of potential magnetic field due to the loss of magnetic field lines, and the actuator is noisy which makes it unsuitable for many uses including enhanced sound experience and, in particular, music, as well.

Thus, in view of the prior art discussed above, there is still a need for a vibrating actuator which overcomes the drawbacks of the prior art mentioned above and which can be used in a variety of applications including high-definition haptic feedback to create immersive experiences for video, gaming and music by satisfying the requirements mentioned above.

SUMMARY OF THE INVENTION

An object of this invention is to provide a vibrating actuator for a variety of applications, including haptic feedback, which provides for a large frequency range, a high vibration force, small size, high power efficiency, silent vibration, steady performance and cost efficient manufacturing.

In one aspect, the present invention provides a vibrating actuator, comprising: a magnetic part including at least two magnets arranged with same polarities facing each other; a receiving part including a hollow member with a cavity for receiving the magnetic part and at least one coil wrapped around the hollow member and fixed thereto; elastic means interconnecting the magnetic part and the hollow member; and a chassis; wherein the magnetic part is fixed to the chassis via attachment means such that the magnetic part, the attachment means and the chassis are stationary; and wherein the receiving part performs a linear movement with changing direction causing the vibration when an alternating current passes through the coil(s).

In another aspect, the present invention provides a vibrating actuator, comprising: a magnetic part including at least two magnets arranged with same polarities facing each other; a receiving part including a hollow member with a cavity for receiving the magnetic part and at least one coil wrapped around the hollow member and fixed thereto; elastic means interconnecting the magnetic part and the hollow member; and a chassis; wherein the elastic means are flat elastic metal or plastic membranes.

In yet another aspect, the present invention provides a vibrating actuator, comprising: a magnetic part including at least two magnets arranged with same polarities facing each other; a receiving part including a hollow member with a cavity for receiving the magnetic part and at least one coil wrapped around the hollow member and fixed thereto; elastic means interconnecting the magnetic part and the hollow member; and a chassis; wherein magnetic guidance means of ferromagnetic material partly surrounding the hollow member and the coil(s) are mounted to the longitudinally outer ends of the magnetic part.

The present invention also provides a method for manufacturing a vibrating actuator, comprising the following steps: assembling a magnetic part by assembling at least two magnets in a dedicated assembly jig using at least one rod, wherein the magnets face each other with the same polarity and have a gap between them; assembling a moving part by wrapping at least one coil of self-bonding copper wire around a hollow member comprising two slots with the coil(s) located in the longitudinally central part of the hollow member between the slots, and heating the coil(s) and the hollow member such that the coil(s) become(s) solid and bind(s) with the hollow member; inserting the magnetic part into the moving part; attaching means from an elastic material to the longitudinally outer ends of the magnetic part and to the outer ends of the hollow member; attaching the magnetic part to a chassis via attachment members extending through the slots in the hollow member.

Further advantageous features can be obtained from the specification and the claims.

DETAILED DESCRIPTION OF THE PREFERRED EMBODIMENTS

The present invention is directed to a vibrating actuator for a variety of applications. In an exemplary application, a vibrotactile voice-coil or moving magnet-type actuator for high-definition haptic feedback to create immersive experiences for video, gaming and music and other immersive experiences is connected to an audio device via an amplifier like a loudspeaker and via an additional low pass filter to limit the audio frequency range to the tactile perceptible range of the skin. The actuator can be worn, for example, around the user's wrist or other body part like a bracelet.

Structure of the Actuator

In one aspect, the present invention provides a unique structure of a vibrating actuator. According to the present invention, the actuator comprises magnets 1, at least one coil 2, a hollow member 4 with a cavity 5 and a chassis 7, wherein the moving part is the external arrangement comprising the coil(s) 2 and the member 4 and the stationary part comprises the internal magnets 1 and the chassis 7. When an alternating current passes through the coil(s) 2, it interacts with the magnetic field of the magnets 1 and generates a mechanical force with changing direction on the moving part comprising the coil(s) 2 and the hollow member 4—this results in a linear movement of the moving part with changing direction, causing the vibration. The vibration is strong because the moving part comprising the coil(s) 2 and the member 4 has more volume and, thus, more mass, than the internal part comprising the magnets 1. Accordingly, compared to prior art devices, the inventive actuator results in a better vibratory performance without changing the overall size and mass of the actuator—which is important if the actuator, in particular, shall be portable or wearable. The structure and functioning of the inventive actuator will now be explained in more detail with reference to FIG. 1-4 which show different views of the actuator.

The stationary part of the actuator contains the at least two magnets 1 having at least one gap in between, wherein the magnets 1 are arranged with same polarities facing each other, i.e., north facing north or south facing south, to create a highly concentrated magnetic field in the plane between them. The gap(s) between the magnets can be filled with at least one spacer 3 made from a nonmagnetic material. The arrangement of magnets 1 is attached to the chassis 7 by two attachment members 8 made of a material which can be the same material as the chassis, wherein the chassis 7 can be a bracelet (which is worn by a user) or at least a casing containing both the actuator and further electronics. The attachment members 8 may, for example, facilitate a "clip-in" type attachment and ensure that the arrangement of magnets 1 remains stationary (by attaching it to the chassis) and maintains the position of the area(s) where the same polarities of the at least two magnets 1 face each other (to create the magnetic field). The attachment members 8 are attached to attachment members 10 on one side thereof (for example, the underside), wherein the attachment members 10 are attached to the longitudinally outer ends of the arrangement of magnets 1. Accordingly, the stationary part comprises the magnets 1, the optional spacer(s) 3, the chassis 7 and the attachment members 8 and 10.

The moving part of the actuator contains the hollow member 4 which is the moving mass—consequently, it is made of a heavy and dense, resp., metal because the larger the mass, the better the vibratory performance of the actuator. As mentioned above, the moving mass, i.e., the hollow member 4 carrying the at least one coil 2, is shaped depending on the shape of the magnets 1 such that the gap between the coil(s) 2 and the magnets 1 is relatively small in order to reduce the loss of magnetic force. For example, the internal cavity 5 of the hollow member 4 and its outer contour should be flat and oblong if the arrangement of the magnets 1 is flat and oblong, or the internal cavity 5 of the hollow member 4 and its outer contour should be cylindrical and oblong if the arrangement of the magnets 1 is cylindrical and oblong—of course, there has to be certain spacing between the arrangement of the magnets 1 and the inner surfaces of the hollow member 4 defining its internal cavity 5 to enable the arrangement of magnets 1 to move within the cavity 5. Slots 9 extend through one side (for example, the underside) of the hollow member 4 in its longitudinal direction to receive the attachment members 8 for connecting the arrangement of magnets 1 to the chassis 7 as mentioned above in connection with the stationary part. Since the linear movement of the moving part occurs along the longitudinal axis of the actuator (i.e., the longitudinal axis of the arrangement of magnets 1 and the hollow member 4, resp.), the slots 9 should be relatively be long—and the extension of the attachment members 8 should be relatively short—enough in longitudinal direction to facilitate the movement of the moving part and, thus, the vibration. Each end of the oblong hollow member 4 is open (the hollow member 4, thus, forming a tube) to allow attachment of elastic elements 6 (see below) to both the attachment members 10 at the longitudinally outer ends of the arrangement of magnets 1 and the hollow member 4 on both ends thereof. The elastic elements 6 allow the moving part to perform its longitudinal movement back and forth without hitting the stationary part, i.e., the arrangement of magnets 1, the chassis 7 and the attachment member 8. In addition to the hollow member 4 the moving part also comprises the at least one coil 2 which is wrapped around the hollow member 4, both together creating one moving piece. Attaching the coil(s) 2 to the hollow member 4 can be achieved, for example, by some form of heat treatment during manufacture. In its resting position on the hollow member 4, the coil(s) 2 surround(s) at least the area(s) where the same polarities of the at least two magnets 1 face each other (see above) but not the whole length of the arrangement of magnets 1. Accordingly, the moving part comprises the at least one coil 2 and the hollow member 4.

The elastic elements 6 essentially form the interface linking the stationary part (i.e., the magnets 1, the optional spacer(s) 3, the chassis 7 and the attachment members 8 and 10) and the moving part (i.e., the hollow member 4 and the at least one coil 2). The elastic elements 6 are attached to the attachment members 10 (which are located at the longitudinally outer ends of the arrangement of magnets 1) and two longitudinal "kebab" rods 11 (see below) passing through the attachment members 10, the magnets 1 and the optional spacer(s) 3. The attachment of the elastic elements 6 to the hollow member 4 can be obtained by using glue or rivets, wherein the outer contour of the elastic elements 6 is the same as the outer contour of the hollow member 4 (seen in a transversal cross section). Accordingly, the elastic elements 6 are fixed to the hollow member 4 at their peripheral edges and to the attachment members 10 in the centre. In order to allow sufficient movement of the moving part (i.e., the at least one coil 2 and the hollow member 4) to create the vibration, the elastic elements 6 have to be highly flexible.

The structure of the inventive actuator as described above has several advantages. Firstly, it results in a better vibratory performance without changing the overall size and mass of the actuator—which is important if the actuator shall be portable or wearable. Secondly, if the magnets 1 were the moving part, as is the case in the prior art, their trajectory could be distorted such that they could even hit the stationary part when the actuator is placed near a metallic surface (which can easily happen if it is portable or wearable) because the magnets are attracted by the metallic surface. This would create friction and, therefore, inefficiency of the actuator. Because, according to the present invention, the magnets 1 are stationary and kept in place, a metal surface coming near the actuator does not affect its functioning because the coil(s) 2 and the hollow member 4 (which form the moving part) are unaffected by the metallic surface as they are not magnetized and, thus, do not change their trajectory.

Membrane

In another aspect, the present invention provides novel membranes interconnecting the moving and stationary parts of the actuator. As indicated above, the moving and stationary parts of vibrating magnet-type actuators are interconnected by elastic elements 6 acting as spring-dampeners for the vibration, wherein the elastic elements 6 are attached to the attachment members 10 (which are located at the longitudinally outer ends of the arrangement of magnets 1) in the centre and to the hollow member 4 at their periphery by using glue or rivets. The elastic elements 6 should allow relatively much displacement to obtain strong vibration, but at the same time occupy relatively little space if the actuator shall be portable or wearable. Thus, flat elastic membranes 6 appear to be ideal for these purposes.

The membranes 6 according to the present invention are shown in FIG. 1-4. They are very thin, i.e., having an approximate thickness of 0.1 mm. Furthermore, it has been found out that a highly flexible metallic material, for example, copper beryllium, results in an almost ideal behavior of the membranes: The alignment between the moving and the stationary parts of the actuator is much more accurate with metallic membranes than with prior art compression springs or non-metallic (for example, rubber) membranes and results in guiding the moving part much more accurately through its trajectory as it vibrates—when using prior art material such as rubber, the moving part will wiggle and move through its trajectory with the result that the moving and stationary parts clash as the moving part moves through its trajectory to create the vibration, which, in turn, creates noise and friction, the latter making the actuator less efficient. Therefore, by achieving the smooth trajectory allowed by the metallic membranes according to the present invention, the actuator becomes both more efficient, as far as the vibratory performance is concerned, and quieter. However, if cost efficiency is required, plastic membranes can also be used as long as they are flat.

In particular for reproducing music and sound in general, resp., it is of special importance that the actuator is relatively quiet. The actuator noise can be reduced further by using perforated flat membranes 6. All membranes disperse air when they flex to allow the moving part to vibrate. By using perforated membranes—in contrast to the prior art solid membranes—less air is dispersed and, thus, the actuator becomes quieter.

In the following, it will be described in more detail how the membranes 6 according to the present invention are arranged and how they work if they are additionally perforated. Membranes are elastic beams and, thus, flex like a beam one end of which is fixed, for example, to a desk and the other end of which freely extends beyond the desk and flexes. The outer (peripheral) edges of the inventive membranes 6 are attached to the moving part (i.e., the hollow member 4 carrying the at least one coil 2). The perforation of the membranes 6 can consist in a C-shaped hole 12 (in case the arrangement of magnets 1 and the hollow member 4 are cylindrical) or in a U-shaped hole 12 (in case the arrangement of magnets 1 and the hollow member are rectangular) tracking three sides of the membranes' edges and creating a "peninsula" of metal in the middle of the membranes 6. This "peninsula" is attached to the attachment members 10 (which are located at the longitudinal outer ends of the arrangement of magnets 1). Accordingly, if the perforated membranes are used with a prior art actuator, the "peninsulae" act like the free end of a beam (which is flexed because it moves with the moving part) and the remaining part of the membranes 6 acts like the fixed end of the beam; if the perforated membranes 6 are used with the inventive actuator described above, the "peninsulae" act like the fixed end of the beam above and the remaining part of the membranes 6 acts like the free end of the beam which is flexed because it moves with the moving part.

Magnetic Guidance Mechanism

Figure 1:
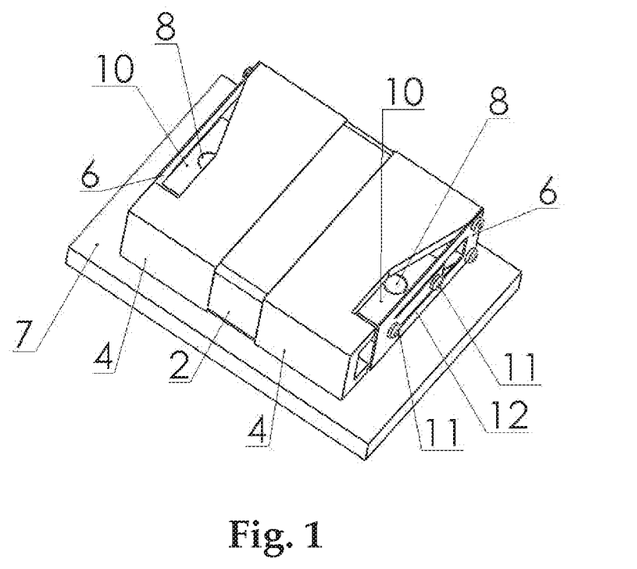
FIG. 1 shows a perspective top view of the vibrating actuator.
Figure 2:
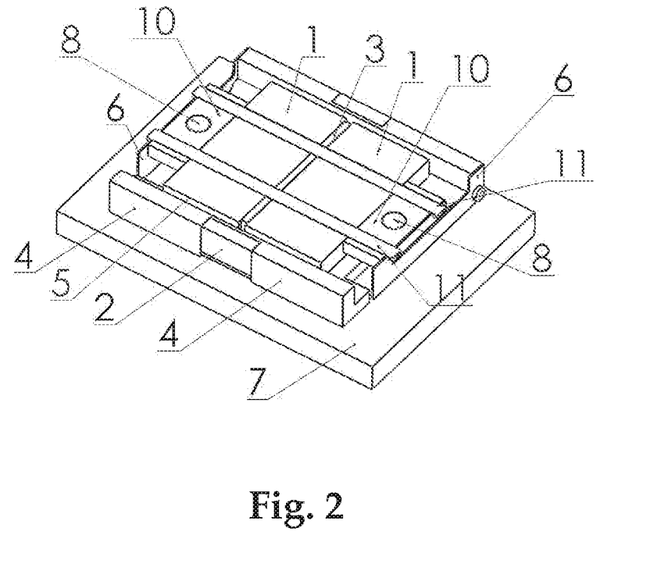
FIG. 2 shows the view from FIG. 1 in a horizontal cross section.
Figure 3:
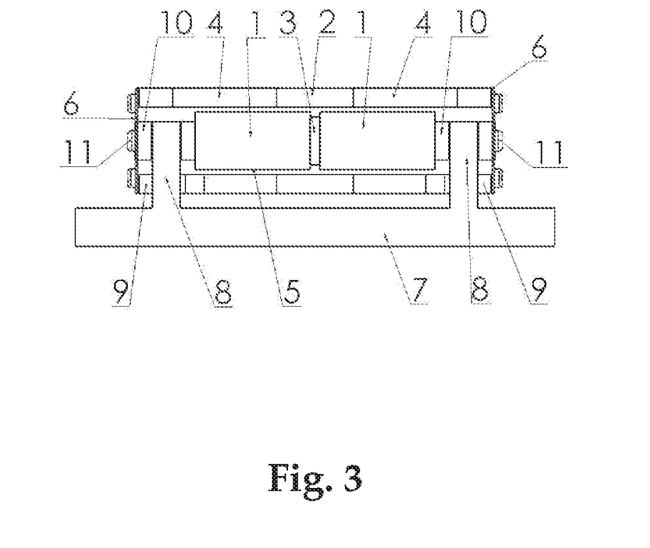
FIG. 3 shows a vertical cross section of the vibrating actuator.
Figure 4:
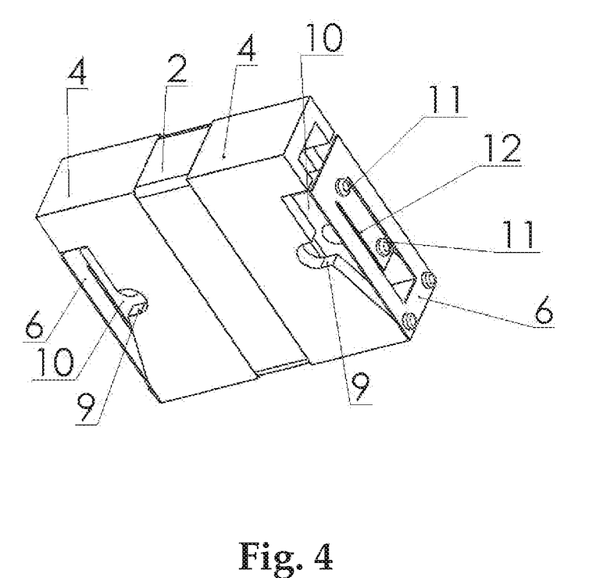
FIG. 4 shows a perspective bottom view of the vibrating actuator.
Figure 5:
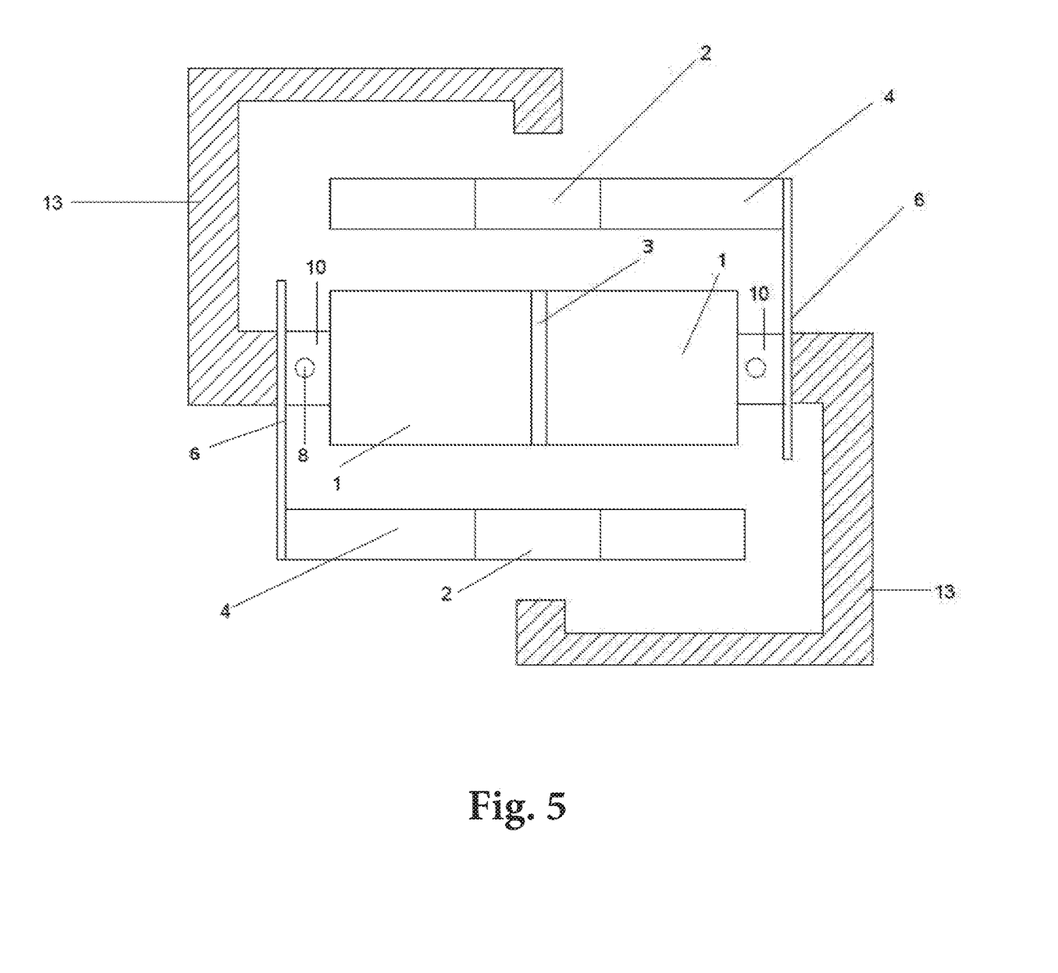
FIG. 5 shows a top view of the vibrating actuator.

In yet another aspect, the present invention provides a guidance mechanism 13 for the magnetic field as shown in FIG. 5. As indicated above, in vibrating magnet-type actuators several magnets 1 can be arranged facing each other with the same polarity to allow a high concentration of magnetic field to be generated inside the at least one coil 2. However, once the magnetic field crosses the surrounding coil(s), the magnetic field lines are lost because they are not guided back to the magnets. It has been found out that, by using an appropriate magnetic circuit, most of this potentially wasted magnetic field can be guided back to the magnets 1 and used to generate additional force and, thus, stronger vibration. Due to the use of the magnetic circuit, the vibratory performance of the actuator can be increased without having to increase the size of the magnets 1—or, if size matters, the volume of the magnets 1 (and, thus, the volume of the actuator) can be reduced compared to prior art actuators without losing vibratory performance.

In the following, it will be described in more detail how the magnetic guidance mechanism according to the present invention are arranged and how they work. Without any additional guidance magnetic field lines pass through the coil(s) 2 and, eventually, will be attracted back to the opposing polarity of the magnets 1. Accordingly, if the magnets 1 in the actuator are arranged facing each other north to north (see above), the field lines created in the area(s) where the magnets 1 face each other will pass through the coil(s) 2 and then arch back to the closest magnet's south polarity. However, these field lines will be quite dispersed and, thus, much of the magnetic field will be lost because the magnetic field lines created in the area(s) where the magnets 1 face each other may take a path of several meters to travel from there to the nearest opposite polarity—even though this pole is only a few millimeters away. The magnetic circuit serves to guide these "wasted" magnetic field lines back to the magnets: essentially, its purpose is to ensure that the magnetic field lines created in the area(s) where the magnets 1 face each other take a shorter route back to the magnets 1. This is achieved by attaching a piece of ferromagnetic material to each of the longitudinally outer ends of the arrangement of magnets 1. The pieces of ferromagnetic material have a U-shape, i.e., they extend a bit outwardly from the arrangement of magnets 1, then radially outside beyond the hollow member 4 and the coil(s) 2 and then longitudinally inward again up to the area(s) where the magnets 1 face each other. In this way, the magnetic field lines are captured when they have passed through the coil(s) 2 and then guided straight back to the magnets 1. Furthermore, since the magnetic circuit is (i) located close to the area(s) where the magnets 1 face each other and (ii) made of ferromagnetic material, the magnetic field lines created in the area(s) where the magnets 1 face each other are attracted by the magnetic circuit—accordingly, those field lines created in the area(s) where the magnets 1 face each other which would normally get lost right away and not even pass through the coil(s) 2 are now attracted by the ferromagnetic material of the magnetic circuit which is located at the other side of (i.e., around) the coil(s) 2. As a result, more magnetic field lines pass through the coil(s) 2, and a stronger electromagnetic force is created which, in turn, makes the actuator more efficient because it uses a larger amount of the magnetic field.

Manufacturing Method

The manufacturing method for the inventive actuator as described above is as follows:

assembling the magnetic part by assembling at least two magnets 1 in a dedicated assembly jig using at least on rod, wherein the magnets 1 face each other with the same polarity and have a gap between them;

assembling the moving part by wrapping at least one coil 2 of self-bonding copper wire around a hollow member 4 comprising two slots 9 with the coil(s) 2 located in the longitudinally central part of the hollow member 4 between the slots 9, and heating the coil(s) 2 and the hollow member 4 such that the coil(s) 2 become(s) solid and bind(s) with the hollow member 4;

inserting the magnetic part into the moving part;

attaching elements 6 from an elastic material to the longitudinally outer ends of the magnetic part and to the outer ends of the hollow member 4;

attaching the magnetic part to the chassis 7 via attachment members 8 extending through the slots 9 in the hollow member 4.

The gap(s) between the at least two magnets can be filled by spacer(s) 3 made of a nonmagnetic material such as brass, aluminum or plastic.

If the actuator shall be provided with the novel membranes 6 described above, it includes the further step of laser cutting membranes 6 from an elastic material before the step of attaching elements 6 from an elastic material to the longitudinally outer ends of the magnetic part and to the outer ends of the hollow member 4. The membranes 6 can be made of metal such as copper beryllium.

If the actuator shall be provided with the magnetic guidance mechanism 13 described above, it includes the further steps of high pressure molding of magnetic guidance elements from ferrite material;

glueing the magnetic guidance mechanism 13 to the longitudinally outer ends of the magnetic part;

after the step of attaching elements (6) from an elastic material to the longitudinally outer ends of the magnetic part and to the outer ends of the hollow member (4).

As mentioned above, the inventive vibrating actuator can be used in a variety of applications including, but not limited to, high-definition haptic feedback to create immersive experiences for video, gaming and music and other immersive experiences. Generally, the vibrator can be used in all applications where a vibratory feedback is desirable, wherein this feedback is not limited to an input to a human user but can also be addressed to a device.

We claim:

1. A method for manufacturing a vibrating actuator, comprising:
   assembling a magnetic part by assembling at least two magnets in a dedicated assembly jig using at least one rod, wherein the at least two magnets face each other with the same polarity and have a gap between them;
   assembling a moving part by wrapping at least one coil of self-bonding copper wire around a hollow member c, wherein each end of the hollow member is open and further comprises two slots with the at least one coil located in a longitudinally central part of the hollow member between the two slots;
   heating the at least one coil and the hollow member such that the at least one coil becomes solid and binds with the hollow member;
   inserting the magnetic part into the moving part;
   attaching an elastic material to longitudinally outer ends of the magnetic part and to outer ends of the hollow member; and
   attaching the magnetic part to a chassis via attachment members, wherein the attachment members are attached to the longitudinally outer ends of the magnetic part and extend through the two slots in the hollow member.

2. The method of claim 1, wherein a spacer comprising a nonmagnetic material is provided in the gap between the magnets.

3. The method of claim 1, comprising:
   laser cutting membranes from the elastic material to provide an elastic member before attaching the elastic material to the longitudinally outer ends of the magnetic part and to the outer ends of the hollow member.

4. The method of claim 3, wherein the membranes are flat and comprise copper beryllium.

5. The method of claim 1, comprising:
   high pressure molding of magnetic guidance member from ferrite material;
   gluing the magnetic guidance member to the longitudinally outer ends of the magnetic part after attaching the elastic material to the longitudinally outer ends of the magnetic part and to the outer ends of the hollow member.

6. The method of claim 1, wherein at least one piece of ferromagnetic material is attached to each of the longitudinally outer ends of the magnetic part.

7. The method of claim 6, wherein the at least one piece of ferromagnetic material is U-shaped.

8. A method for manufacturing a vibrating actuator, comprising:
   assembling a magnetic part by assembling at least two magnets in a dedicated assembly jig using at least one rod, wherein the at least two magnets face each other with the same polarity and have a gap between them;
   assembling a moving part by wrapping at least one coil of self-bonding copper wire around a hollow member comprising two slots with the at least one coil located in a longitudinally central part of the hollow member between the two slots;
   heating the at least one coil and the hollow member such that the at least one coil becomes solid and binds with the hollow member;
   inserting the magnetic part into the moving part, wherein at least one piece of ferromagnetic material is attached to each of longitudinally outer ends of the magnetic part, wherein the at least one piece of ferromagnetic material
   extends outward from the magnetic part; and
   then radially outside beyond the hollow member to one or more coils; and
   then longitudinally inward to an area where the magnets face each other; and
   attaching an elastic material to the longitudinally outer ends of the magnetic part and to outer ends of the hollow member; and
   attaching the magnetic part to a chassis via attachment members extending through the two slots in the hollow member.

9. A method for manufacturing a compact vibrating actuator, comprising:
   providing a stationary part having:
      a pair of magnets affixed to a chassis, wherein the pair of magnets are aligned such that the same polarity of the pair of magnets face each other with a gap between them;
   providing a moving part having:
      a hollow member with open ends having a cavity with at least one coil wrapped around it, wherein a center of the at least one coil coincides with a center of the gap of the pair of magnets;
      providing a pair of attachment members to secure and hold the chassis and the pair of magnets such that the attachment members are attached to longitudinally outer ends of the pair of magnets and extend through slots in the hollow member; and
      providing an elastic element linking the stationary part and the moving part.

10. The method of claim 9, wherein the chassis is casted as a bracelet.

11. The method of claim 10, wherein the bracelet is casted to include associated electronics.

12. The method of claim 9, wherein the elastic element is attached to the pair of attachment members.

13. The method of claim 12, wherein the pair of attachment members comprise a pair of longitudinal rods.

14. A method for manufacturing a compact vibrating actuator, comprising:
   providing a stationary part having:
      a pair of magnets affixed to a chassis, wherein the pair of magnets are aligned with the north pole of the each of the pair of magnets facing each other with a gap between them, wherein the gap between the pair of magnets is filled by a non-magnetic material;
   providing a pair of attachment members to secure and hold the chassis and the pair of magnets;
   providing a moving part having:
      a hollow member with open ends and having a cavity with at least one coil wrapped around it, wherein a center of the at least one coil coincides with a center of the gap of the pair of magnets, and wherein the attachment members are attached to longitudinally outer ends of the pair of magnets and extend through slots in the hollow member; and providing an elastic element linking the stationary part and the moving part.

15. The method of claim 14, wherein the non-magnetic material is a metal.

16. The method of claim 14, wherein the non-magnetic material is plastic.

17. The method of claim 14, further comprising attaching at least one piece of ferromagnetic material to each of the longitudinally outer ends of the pair of magnets.

18. The method of claim 17, wherein the at least one piece of ferromagnetic material is U-shaped.

19. The method of claim 14, wherein the chassis is casted as a bracelet.

20. A method for manufacturing a compact vibrating actuator, comprising:
   providing a stationary part having:
      a pair of magnets affixed to a chassis, wherein the pair of magnets are aligned with the north pole of each of the pair of magnets facing each other with a gap between them, wherein the gap between the pair of magnets is filled by a non-magnetic material;
      attaching at least one piece of ferromagnetic material to each of the longitudinally outer ends of the pair of magnets, wherein the at least one piece of ferromagnetic material:
         extends outward from the pair of magnets; and
         then radially outside beyond the hollow member to one or more coils; and
         then longitudinally inward to the area, where the magnets face each other;
   providing a pair of attachment members to secure and hold the chassis and the pair of magnets;
   providing a moving part having:
      a hollow member with a cavity with at least one coil wrapped around it,
      wherein a center of the at least one coil coincides with a center of the gap of the pair of magnets; and
   providing an elastic element linking the stationary part and the moving part.

* * * * *